US007935882B2

(12) United States Patent
Pickard et al.

(10) Patent No.: US 7,935,882 B2
(45) Date of Patent: May 3, 2011

(54) SELF POWERED ELECTRIC GENERATING FOOD HEATER

(75) Inventors: Donald Wayne Pickard, Sherborn, MA (US); Frank E. DiLeo, Oxford, MA (US); Aleksandr S. Kushch, Poway, CA (US); John C. Bass, La Jolla, CA (US); Markvard Haurbach, San Diego, CA (US)

(73) Assignee: Hi-Z Technology, Inc., San Diego, CA (US)

( * ) Notice: Subject to any disclaimer, the term of this patent is extended or adjusted under 35 U.S.C. 154(b) by 1325 days.

(21) Appl. No.: 11/354,190

(22) Filed: Feb. 14, 2006

(65) Prior Publication Data

US 2007/0204850 A1 Sep. 6, 2007

(51) Int. Cl.
*H01L 35/00* (2006.01)

(52) U.S. Cl. ........................................ 136/205; 136/242

(58) Field of Classification Search ........... 136/200–242
See application file for complete search history.

(56) References Cited

U.S. PATENT DOCUMENTS 4,773,847 A * 9/1988 Shukla et al. .................. 431/46
6,527,548 B1 * 3/2003 Kushch et al. ................ 432/222

OTHER PUBLICATIONS

Nuwayhid, R. et al. "Practical Design Considerations for Rural Stove-top Thermoelectric Generator". Proc. 19th Int. Conf. on Thermoelectrics. p. 490-502. (2000).*

Killander, A. et al. "A Stove-Top Generator for Cold Areas". Proc. 15th Int. Conf. on Thermoelectrics. p. 390-393. (1996).*

Uemura, K. "Thermoelectric Modules for Power Generation and Cooling" SCT-93 Short Course on Thermoelectrics, The International Thermoelectric Society. (1993).*

* cited by examiner

*Primary Examiner* — Jeffrey T Barton

(74) *Attorney, Agent, or Firm* — John R. Ross; John R. Ross, III

(57) ABSTRACT

A self-powered food heater. The food heater includes a burner with an electric fuel pump and an electric blower, a fire box, a water tank and electronic controls. The food heater also includes a set of thermoelectric modules compressed against a heat transfer surface of the tank. Hot exhaust leaving the burner enters the fire box. Some of the heat from the fire box passes through the thermoelectric modules generating sufficient electric power to power the fuel pump and the blower. Water in the tank is heated to its boiling temperature. Heat from the boiling water heats food also contained in the tank. In a preferred embodiment special compression frames provide substantially uniform compression, within desired ranges, of the modules between a portion of the heat transfer surface of the tank and a module cover plate. Fins may be provided on the cover plate or insulating spacers may be added to assure the hot side temperatures of the modules are within desired ranges to provide desired power output without damaging the modules. In a preferred embodiment the modules are compressed against a heat transfer surface on the outside of the tank within the fire box.

14 Claims, 10 Drawing Sheets

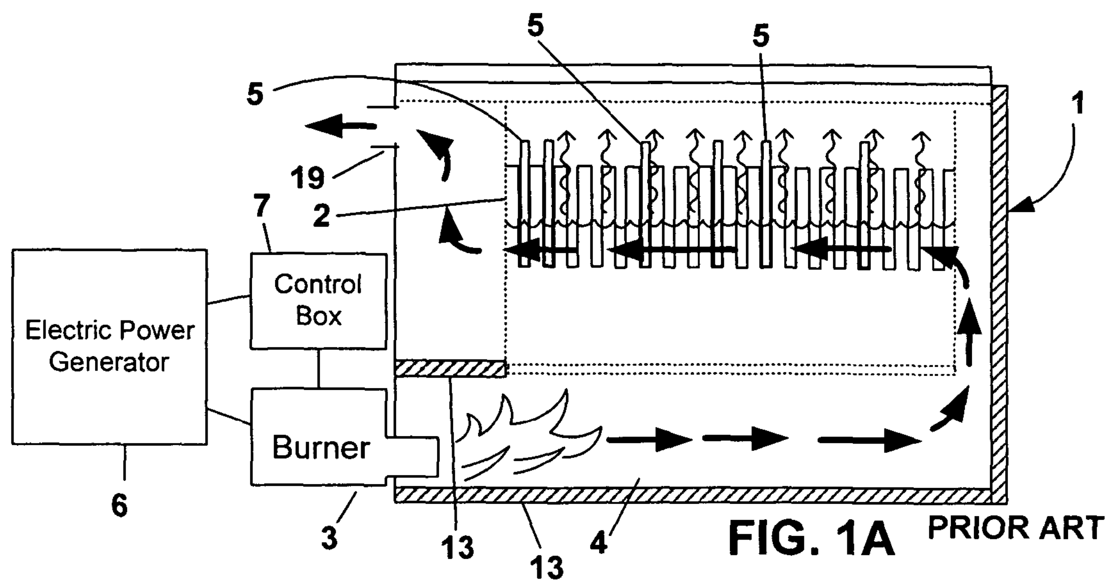
FIG. 1A PRIOR ART
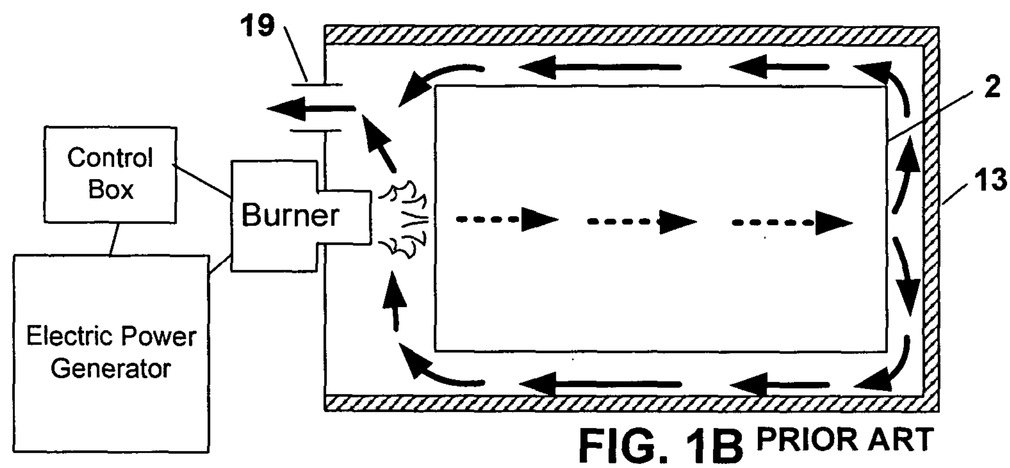
FIG. 1B PRIOR ART
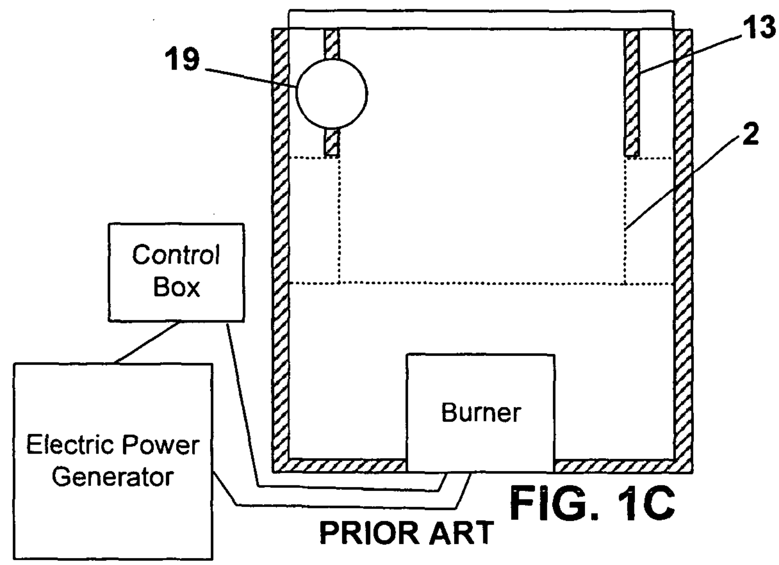
PRIOR ART FIG. 1C

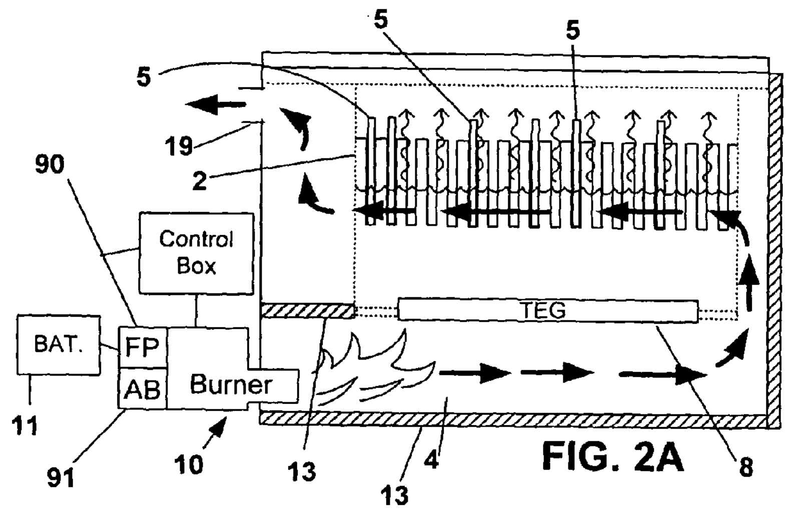
FIG. 2A
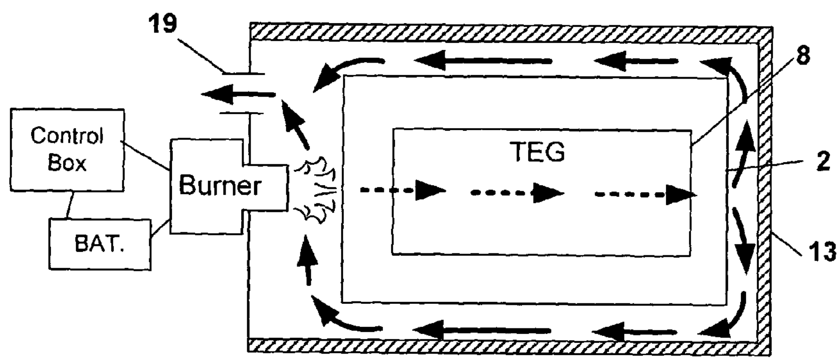
FIG. 2B
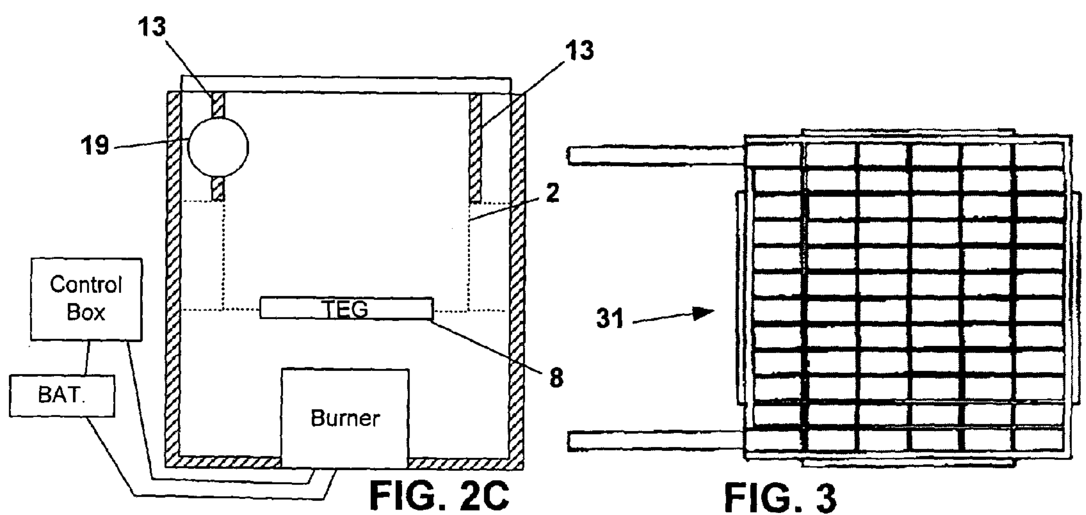
FIG. 2C
FIG. 3

FIG. 4
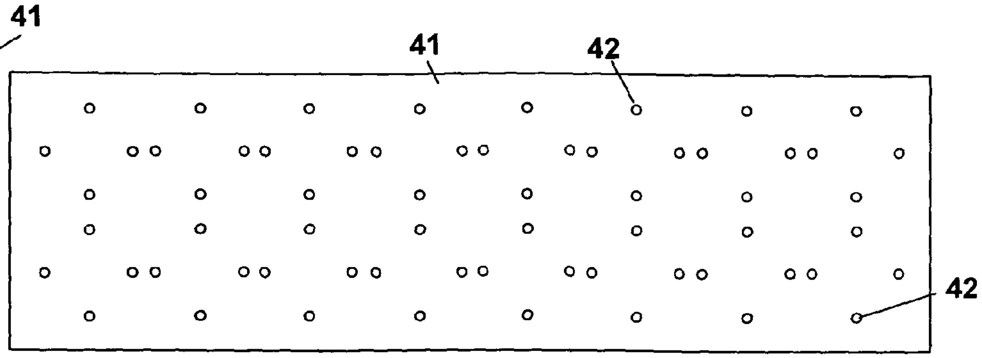
FIG. 5
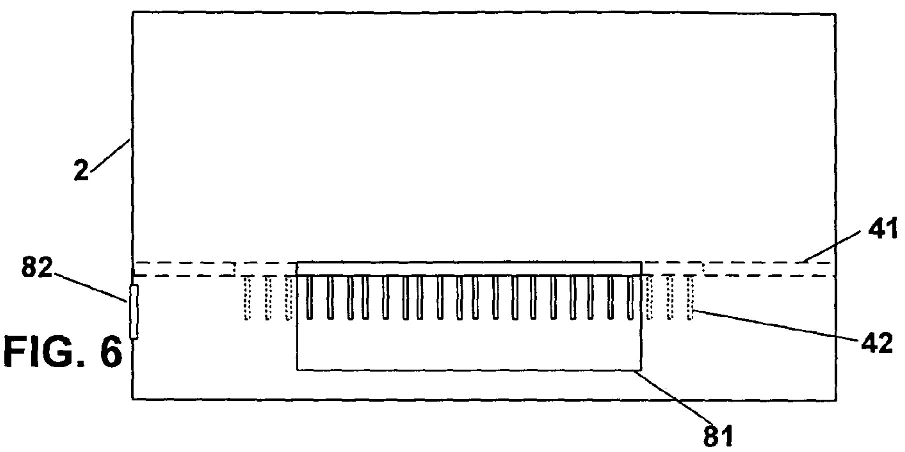
FIG. 6
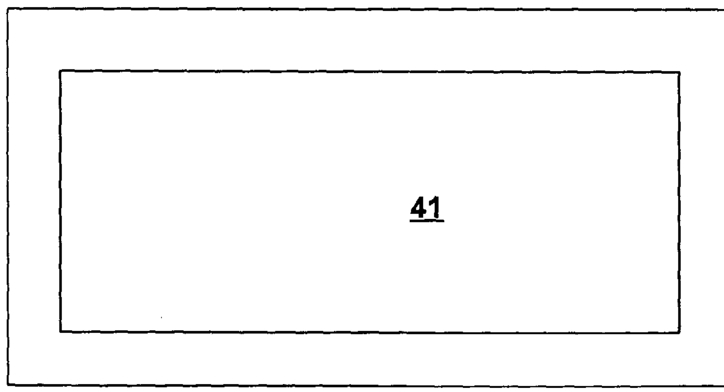
FIG. 7
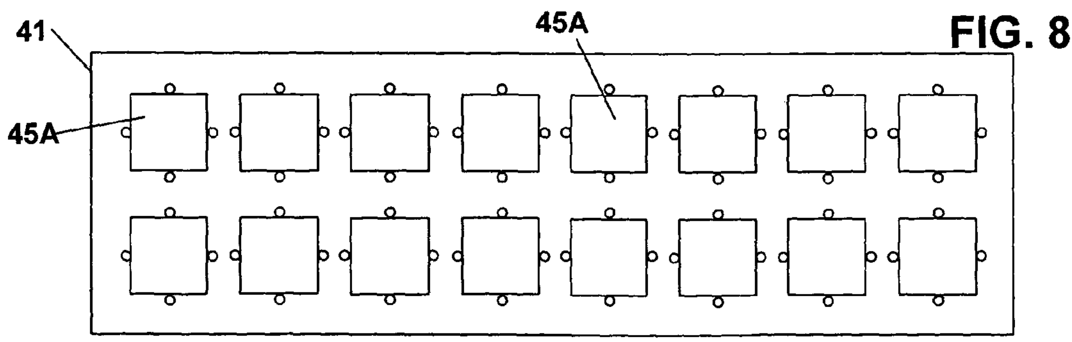
FIG. 8

| Time min | T water °C | Voltage Battery, V | Current Battery, A | Battery W from(-) in(+) | Voltage TEG, V | Current TEG, A | Power TEG, W |
|---|---|---|---|---|---|---|---|
| 0 | 21 | 12.55 | - | - | | | |
| 0.5 | 21 | 12.13 | - 8.6 to –8.4 | - 103.1 | | - | - |
| 1 | 21 | 12.32 | - 3.6 | - 44.4 | - | - | - |
| 1.5 | 22 | 12.32 | - 3.6 | - 44.4 | 12.67 | 0.20 | 2.5 |
| 2 | 22 | 12.38 | - 3.0 | - 37.1 | 12.76 | 0.50 | 6.4 |
| 2.5 | 23 | 12.49 | - 2.2 | - 27.5 | 12.96 | 1.23 | 15.2 |
| 3 | 24 | 12.59 | - 1.55 | - 19.5 | 13.09 | 2.00 | 26.2 |
| 3.5 | 24 | 12.68 | - 1.05 | - 13.3 | 13.26 | 2.5 | 33.2 |
| 4 | 25 | 12.76 | - 0.65 | - 8.3 | 13.36 | 2.90 | 38.7 |
| 4.5 | 26 | 12.82 | - 0.35 | - 4.5 | 13.46 | 3.2 | 43.1 |
| 5 | 27 | 12.86 | - 0.1 | - 1.3 | 13.52 | 3.39 | 45.8 |
| 5.5 | 28 | 12.89 | + 0.05 | + 0.6 | 13.55 | 3.85 | 52.2 |
| 6 | 29 | 12.93 | 0.1 | 1.3 | 13.61 | 3.67 | 49.9 |
| 6.5 | 30 | 12.97 | 0.2 | 2.6 | 13.64 | 3.76 | 51.3 |
| 7 | 30 | 12.99 | 0.35 | 4.5 | 13.70 | 3.83 | 52.5 |
| 7.5 | 33 | 13.02 | 0.4 | 5.2 | 13.72 | 3.87 | 53.1 |
| 8 | 34 | 13.05 | 0.45 | 5.9 | 13.75 | 3.92 | 53.9 |
| 8.5 | 34 | 13.08 | 0.48 | 6.3 | 13.77 | 3.94 | 54.3 |
| 9 | 35 | 13.09 | 0.50 | 6.5 | 13.80 | 3.96 | 54.6 |
| 9.5 | 37 | 13.12 | 0.50 | 6.6 | 13.82 | 3.98 | 55.0 |
| 10 | 37 | 13.14 | 0.55 | 7.2 | 13.84 | 3.98 | 55.1 |
| 10.5 | 39 | 13.15 | 0.53 | 7.0 | 13.86 | 3.98 | 55.2 |
| 11 | 40 | 13.17 | 0.53 | 7.0 | 13.87 | 3.97 | 55.1 |
| 11.5 | 41 | 13.17 | 0.53 | 7.0 | 13.88 | 3.97 | 55.1 |
| 12 | 42 | 13.18 | 0.53 | 7.0 | 13.89 | 3.96 | 55.0 |
| 12.5 | 43 | 13.20 | 0.50 | 6.6 | 13.91 | 3.95 | 54.9 |
| 13 | 45 | 13.21 | 0.50 | 6.6 | 13.91 | 3.94 | 54.8 |
| 13.5 | 46 | 13.22 | 0.50 | 6.6 | 13.92 | 3.93 | 54.7 |
| 14 | 47 | 13.23 | 0.50 | 6.6 | 13.92 | 3.91 | 54.4 |
| 14.5 | 49 | 13.23 | 0.50 | 6.6 | 13.93 | 3.90 | 54.3 |

FIG. 19a

| Time min | T water °C | Voltage Battery, V | Current Battery, A | Battery W from(-) in(+) | Voltage TEG, V | Current TEG, A | Power TEG, W |
|---|---|---|---|---|---|---|---|
| 15 | 51 | 13.23 | 0.45 | 6.0 | 13.93 | 3.88 | 54.0 |
| 15.5 | 51 | 13.24 | 0.43 | 5.7 | 13.94 | 3.90 | 54.4 |
| 16 | 53 | 13.25 | 0.43 | 5.7 | 13.94 | 3.90 | 54.4 |
| 16.5 | 54 | 13.25 | 0.43 | 5.7 | 13.95 | 3.88 | 54.1 |
| 17 | 56 | 13.25 | 0.45 | 7.0 | 13.94 | 3.86 | 53.8 |
| 17.5 | 56 | 13.25 | 0.45 | 7.0 | 13.94 | 3.83 | 53.3 |
| 18 | 57 | 13.25 | 0.43 | 5.7 | 13.94 | 3.82 | 53.3 |
| 18.5 | 59 | 13.25 | 0.40 | 5.3 | 13.93 | 3.79 | 52.8 |
| 19 | 60 | 13.25 | 0.38 | 5.0 | 13.93 | 3.78 | 52.7 |
| 19.5 | 61 | 13.24 | 0.35 | 4.6 | 13.92 | 3.76 | 52.3 |
| 20 | 62 | 13.24 | 0.35 | 4.6 | 13.92 | 3.74 | 52.1 |
| 20.5 | 64 | 13.24 | 0.35 | 4.6 | 13.91 | 3.71 | 51.6 |
| 21 | 66 | 13.23 | 0.33 | 4.4 | 13.90 | 3.69 | 51.3 |
| 21.5 | 67 | 13.22 | 0.30 | 4.0 | 13.89 | 3.67 | 51.0 |
| 22 | 69 | 13.22 | 0.25 | 3.3 | 13.89 | 3.65 | 50.7 |
| 22.5 | 69 | 13.21 | 0.25 | 3.3 | 13.88 | 3.62 | 50.2 |
| 23 | 72 | 13.20 | 0.23 | 3.0 | 13.86 | 3.60 | 49.9 |
| 23.5 | 72 | 13.19 | 0.20 | 2.6 | 13.85 | 3.54 | 49.0 |
| 24 | 73 | 13.18 | 0.15 | 2.0 | 13.84 | 3.53 | 48.9 |
| 24.5 | 74 | 13.17 | 0.15 | 2.0 | 13.82 | 3.52 | 48.6 |
| 25 | 76 | 13.15 | 0.10 | 1.3 | 13.81 | 3.49 | 48.2 |
| 25.5 | 78 | 13.14 | 0.10 | 1.3 | 13.78 | 3.48 | 48.0 |
| 26 | 78 | 13.12 | 0.10 | 1.3 | 13.77 | 3.47 | 47.8 |
| 26.5 | 80 | 13.12 | 0.10 | 1.3 | 13.76 | 3.47 | 47.7 |
| 27 | 80 | 13.11 | 0.10 | 1.3 | 13.76 | 3.46 | 47.6 |
| 27.5 | 81 | 13.10 | 0.10 | 1.3 | 13.75 | 3.45 | 47.4 |
| 28 | 83 | 13.10 | 0.10 | 1.3 | 13.75 | 3.45 | 47.4 |
| 28.5 | 84 | 13.10 | 0.10 | 1.3 | 13.74 | 3.45 | 47.4 |
| 29 | 85 | 13.10 | 0.10 | 1.3 | 13.74 | 3.45 | 47.4 |
| 29.5 | 86 | 13.09 | 0.10 | 1.3 | 13.74 | 3.45 | 47.4 |
| 30 | 88 | 13.09 | 0.10 | 1.3 | 13.74 | 3.44 | 47.3 |
| 30.5 | 89 | 13.09 | 0.10 | 1.3 | 13.74 | 3.45 | 47.4 |
| 31 | 90 | 13.09 | 0.10 | 1.3 | 13.74 | 3.45 | 47.4 |
| 31.5 | 92 | 13.09 | 0.10 | 1.3 | 13.73 | 3.45 | 47.4 |
| 32 | 93 | 13.09 | 0.10 | 1.3 | 13.74 | 3.45 | 47.4 |
| 32.5 | 93 | 13.09 | 0.10 | 1.3 | 13.73 | 3.44 | 47.2 |
| 33 | 94 | 13.09 | 0.10 | 1.3 | 13.74 | 3.45 | 47.4 |
| 33.5 | 97 | 13.10 | 0.10 | 1.3 | 13.73 | 3.45 | 47.4 |

FIG. 19b

SELF POWERED ELECTRIC GENERATING FOOD HEATER

The present invention relates to food heaters and especially to self powered heaters. This invention was first actually reduced to practice under a research and development contract with the United States Army (contract no. W911QY-05-C-3349) and the U.S. government has rights in the invention.

BACKGROUND OF THE INVENTION

Prior art Multi-Ration Heater (MRH) 1 (manufactured by TRI Tech USA, Inc. with offices in 3 Green Tree Drive, South Burlington, Vt. 05403) has been developed for the US Army Soldier System Center in order to provide military personnel with a hot meal in the field (see FIGS. 1A-1C). FIG. 1A shows a side view of MRH 1, FIG. 1B shows a top view of MRH 1, and FIG. 1C shows a front view of MRH 1. MRH 1 is capable of re-thermalizing eighteen tray packs 5 of food in 30-45 minutes. MRH 1 is equipped with 15 gallon tank 2 for holding water, which is heated by a Diesel or JP-8 fired burner 3 manufactured by R. W. Beckett Corp. The burner includes a fuel pump and a blower both powered by alternating current supplied by liquid-fuel burning electric power generator 6. The burner is adjacent to firebox 4 of MRH 1. Tank 2 is preferably fabricated from stainless steel. Also, the bottom of tank 2 is approximately 1/16 inch think stainless steel and serves as the top of firebox 4. Hot exhaust from the burner passes under tank 2 and passes tank 2 sidewalls and exits through exhaust manifold 19. As it passes under tank 2 and next to the sidewalls of tank 2, the hot exhaust heats the water to boiling at approximately 100° C. The boiling water produces steam that re-thermalizes tray packs 5. Control box 7 is utilized for controlling burner 3. MRH 1 also includes thermal insulation 13.

MRH 1 is portable can be installed on the back of a vehicle as a heat-on-the-move concept. MRH 1 is capable of starting and trouble-free operation at temperatures ranging from −32 to +49° C. MRH 1 is manufactured of stainless steel, so field environment (rain, mist, snow, etc.) does not cause any corrosion problems. A sensor automatically shuts off the burner if the water tank level drops below a minimum allowable level of 1.5-2.5 inches. Burner 3 requires about 200 Watts of electric power for steady state operation. The generator requires maintenance, is noisy, and increases the weight. Also, the generator adds complexity to operation of MRH 1.

Thermoelectric devices are well known and have been commercially available for about 30 years. One such module is described in U.S. Pat. No. 5,892,656 that is incorporated herein by reference. The module described in that patent includes 98 couples. Its dimensions are 2.5 inches×2.5 inches×0.2 inch and with a temperature difference of 360° F. (200° C.) will produce 14 Watts at 1.65 volts. Hi-Z also makes a 20 Watt module as Model No. HZ-20 that produces a nominal 20 Watts with a 200° C. temperature difference (with Tcold at 30° C.) and about 11.3 Watts with a 150° C. temperature difference.

What is needed is a self powered ration heater that is capable of re-thermalizing tray packs and simultaneously generating electricity that is sufficient to run itself.

SUMMARY OF THE INVENTION

The present invention provides a self-powered food heater. The food heater includes a burner with an electric fuel pump and an electric blower, a fire box, a water tank and electronic controls. The food heater also includes a set of thermoelectric modules compressed against a heat transfer surface of the tank. Hot exhaust leaving the burner enters the fire box. Some of the heat from the fire box passes through the thermoelectric modules generating sufficient electric power to power the burner fuel pump, the blower and electronic controls. Water in the tank is heated to its boiling temperature. Heat from the boiling water heats food also contained in the tank. In a preferred embodiment special compression frames provide substantially uniform compression, within desired ranges, of the modules between the heat transfer surface of the tank and a module cover plate. Fins may be provided on the cover plate or insulating spacers may be added to assure the hot side temperatures of the modules are within desired ranges to provide desired power output without damaging the modules. In a preferred embodiment the modules are compressed against a heat transfer surface on the outside of the tank within the fire box.

BRIEF DESCRIPTION OF THE DRAWINGS

FIGS. 1A-1C show a prior art multi-ration heater.

FIGS. 2A-2C show a preferred embodiment of the present invention.

FIG. 3 shows a preferred thermoelectric module.

FIG. 4 shows a preferred cold plate.

FIG. 5 shows a bottom view of the cold plate of FIG. 4.

FIG. 6 shows an installed preferred cold plate.

FIG. 7 shows a top view of an installed preferred cold plate.

FIGS. 8-11B show a sequence of installing a preferred thermoelectric generator.

FIGS. **19*a*-19*b*** show test results.

Figure 20:
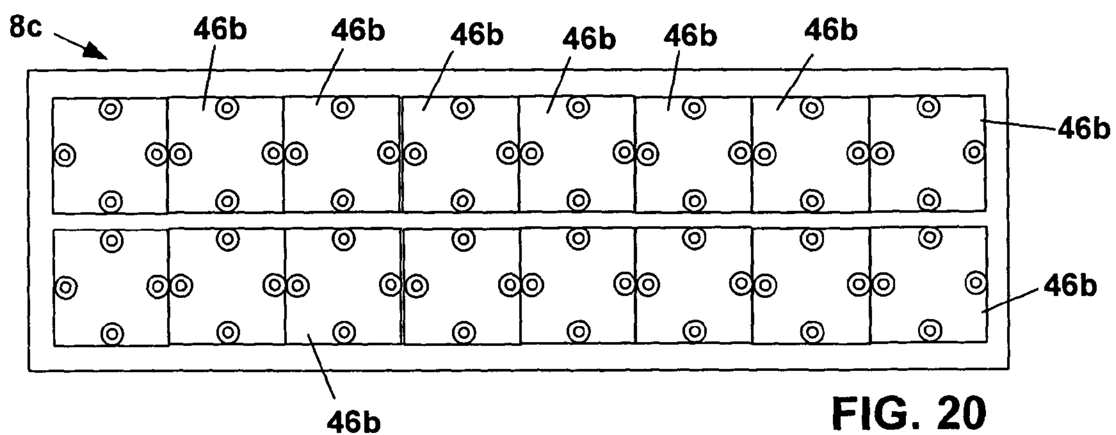

FIG. 20 shows an assembled thermoelectric generator.

DETAILED DESCRIPTION OF THE PREFERRED EMBODIMENTS

FIGS. 2A-2C show a preferred embodiment of the present invention. FIG. 2A is a side view, FIG. 2B is a top view, and FIG. 2C is a front view. In the preferred embodiment, MRH 1 (FIGS. 1A-1C) has been modified. Burner 3 (with alternating current blower and fuel pump) and electric power generator 6 have been removed. A hole has been cut into the bottom of tank 2 and thermoelectric generator 8 has been welded in place in the hole between tank 2 and firebox 4 so that for the area of the generator, the generator now functions as an approximately 32 inch×9.5 inch portion of the bottom of the tank and a similar size portion of the top of the firebox. Burner 10 (with DC motor and fuel pump) has been replaced burner 3. Battery 11 has been added. In the preferred embodiment, thermoelectric generator 8 generates an amount of electricity that is sufficient to operate the electrical equipment of burner 10 and charge battery 11 while the heat produced by burner 10 (some of which passes through generator 8) re-thermalizes trays 5. Thermoelectric generator 8 is configured to provide power directly to electric fuel pump 90 and electric blower 91 of burner 10. The generator provides power to battery 11 to recharge it. Therefore, during normal operation of burner 10, burner 10 can receive its power directly from thermoelectric generator 8 or battery 11.

Burner with DC Blower and Fuel Pump

In a preferred embodiment burner 10 is a diesel Heat Wise burner (manufactured by Heat Wise, Inc. with offices in 1528

Rocky Pine Rd, Middle Island, N.Y., 11953). The Heat Wise burner has a capacity of 70,000-140,000 Btu/hr. Its electric power requirements to drive the DC blower and fuel pump plus electronic controls are 100 W for 30 seconds at start up, then 38 W to 40 W at steady state.

Thermoelectric Generator

A preferred thermoelectric generator 8 includes the following four major components: sixteen thermoelectric modules 31 (FIG. 3), and a compression system for compressing each of the modules between the bottom of the tank and the hot side cover plate and thermal interface materials (hot side—mica, cold side alumina wafers of 0.01 inch thick).

Modules

Preferably, thermoelectric modules 31 are HZ-20 thermoelectric modules available from Hi-Z corporation in San Diego, Calif., part no. HZ-20. The HZ-20 thermoelectric module is similar to the HZ-14 thermoelectric module described in U.S. Pat. No. 5,892,656 with an exception being that the HZ-20 model includes 71 couples. Also, the HZ-20 includes the following electrical properties:

Electrical Properties (as a generator)

| | Value | Tolerance |
|---|---|---|
| Power (at $T_h$ = 250° C., $T_c$ = 50° C.) | 19 Watts | minimum |
| Load Voltage | 2.38 Volts | +/−0.1 |
| Internal Resistance | 0.3 ohm | +/−0.05 |
| Current | 8 Amps | +/−1 |
| Open Circuit Voltage | 5.0 Volts | +/−0.3 |
| Efficiency | 4.5% | minimum |

Cold Side

The cold side of modules 31 are compressed against stainless steel plate 41 (FIGS. 4 and 5) which is part of the bottom of tank 2. Preferably, plate 41 is approximately ⅜ inch thick and has a length of approximately 32 inches and a width of approximately 9.5 inches. Plate 41 is preferably fine ground on the module side in order to obtain flatness within 0.001 inch for each individual module in order to achieve optimum heat transfer between the modules and cold plate 41. Threaded compression rods 42 are installed into plate 41 as shown in FIG. 5. Compression rods 42 are part of the compression system. After compression rods 42 are installed into plate 41, plate 41 is welded to the bottom of tank 2. (Alternatively, compression rods 42 can be installed into plate 41 after the plate has been welded to the bottom of tank 2). FIG. 6 shows a side view of plate 41 welded to tank 2 and FIG. 7 shows a top view of plate 41 welded to the bottom of tank 2. FIG. 6 also shows access hatch 81 and burner port 82.

Applying Thermoelectric Modules

Figure 9:
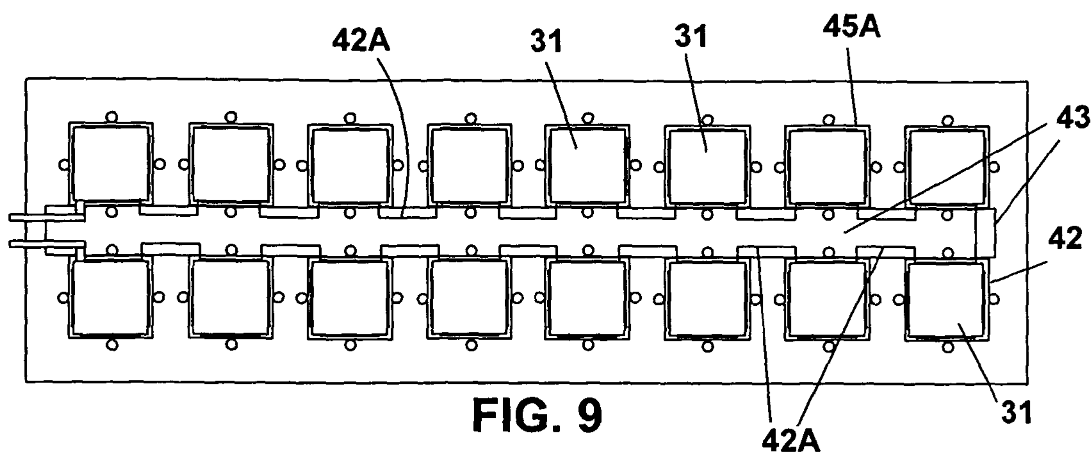
Figure 10:
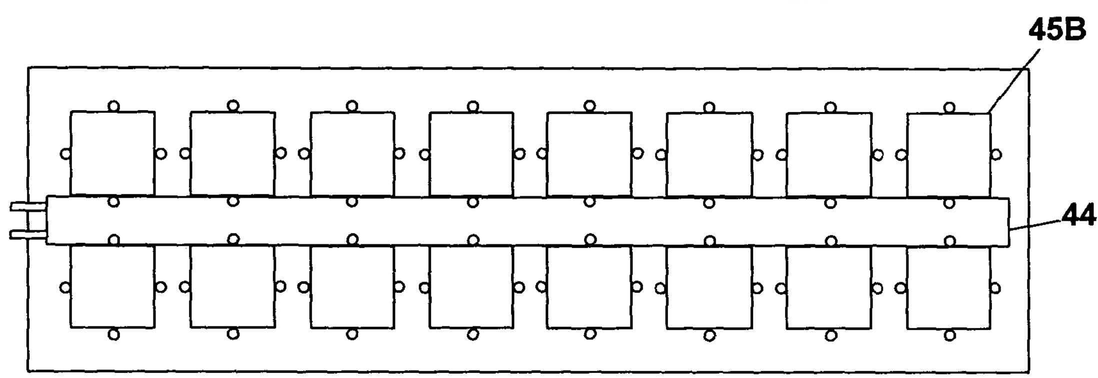

Electrical insulating ceramic plates 45A are placed on plate 41 adjacent to compression rods 42, as shown in FIG. 8. A preferred plate 45A is alumina wafer 0.01 inch thick manufactured by Kyocera, Inc. Thermoelectric modules 31 are placed over plates 45A and electrically connected in series via connectors 42A over mica strip electrical insulator 43, as shown in FIG. 9. Mica strip electrical insulator 44 is then placed over the electrical wires, as shown in FIG. 10. Mica electrical insulating mica sheets 45B are placed over modules 31.

Hot Side

Figure 11A:
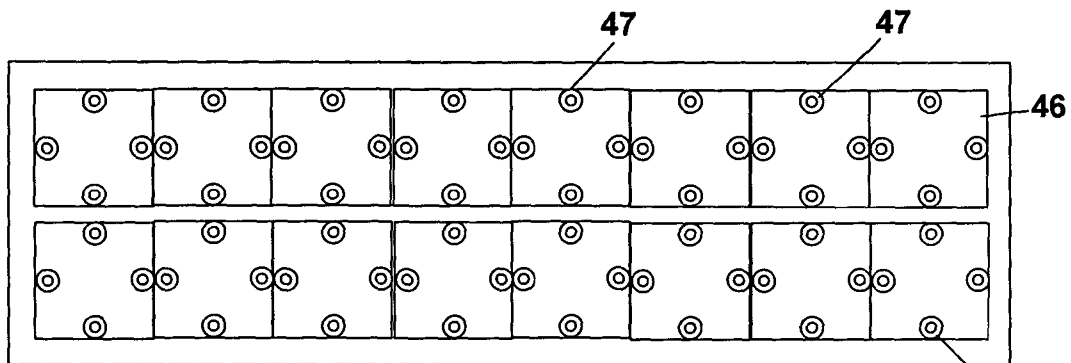
Figure 11B:
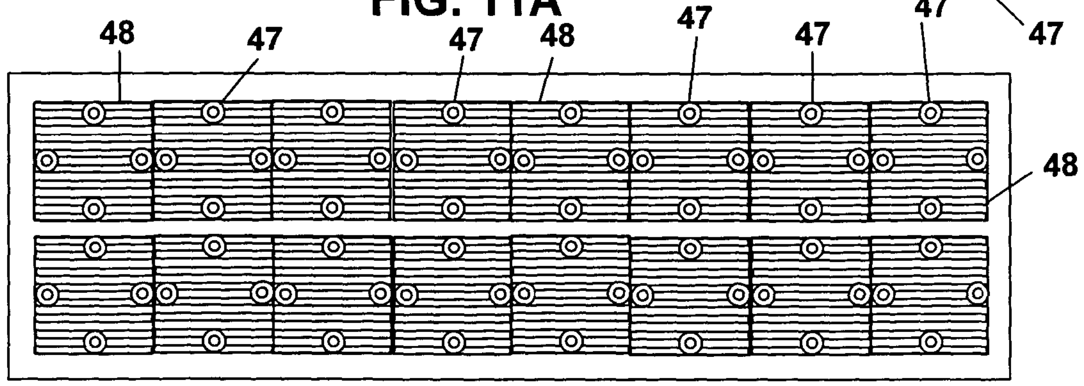
Figure 12:
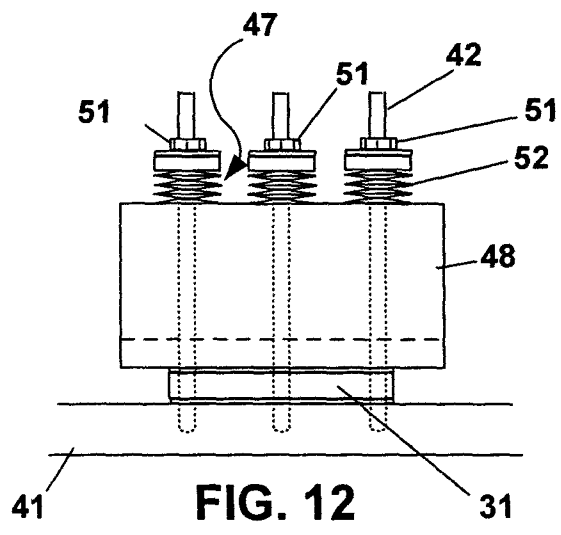
FIGS. 12-14 show details of a preferred compression system.

In FIG. 11, sixteen flat cover plates 46 have been place over insulating mica sheets 45B and have been secured tightly by compression systems 47. Alternatively, as shown in FIG. 12, 16 fin type cover plates 48 could be used to increase the hot-side temperature of the modules. Like the flat plates they would be placed over mica sheets 45B and secured tightly by compression system 47.

Compression System

Figure 13:
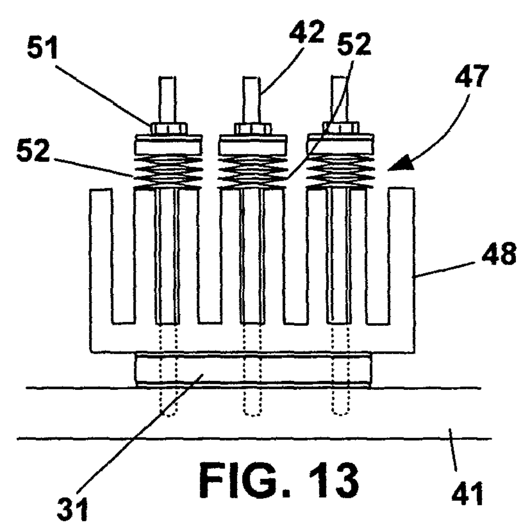
Figure 14:
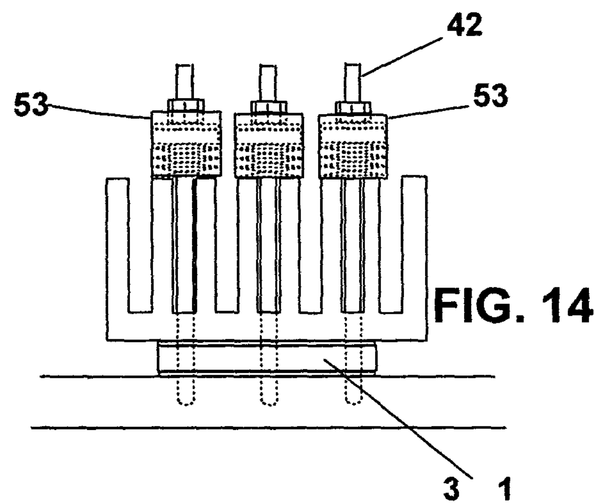

A side view of a fin type hot side cover plates 48 is shown in FIGS. 12 and 13. Compression system 47 ensures that there is excellent thermal contact on both sides of thermoelectric module 31. For each module, four threaded compression rods 42 are in tension to apply compressive force on both sides of thermoelectric module 31. These rods also act as modulator locators assuring the correct positioning of the modules. The tension is applied by tightening of nuts 51 compressing Belleville washers 52. Belleville washers 52 serve to keep the compressive force relatively constant over long periods. In a preferred embodiment six Belleville washers per compression rod are utilized. Applicants recommend that each of the four nuts 51 be tightened enough to apply a compressive force of 200 pounds per square inch to both sides of modules 31. FIG. 14 shows a preferred embodiment in which cylindrical heat shield 53 has been added to cover compression system 47. In order to ensure proper compression force over long periods of time, the Belleville washers are made of inconel.

Electric Connectivity

Figure 15:
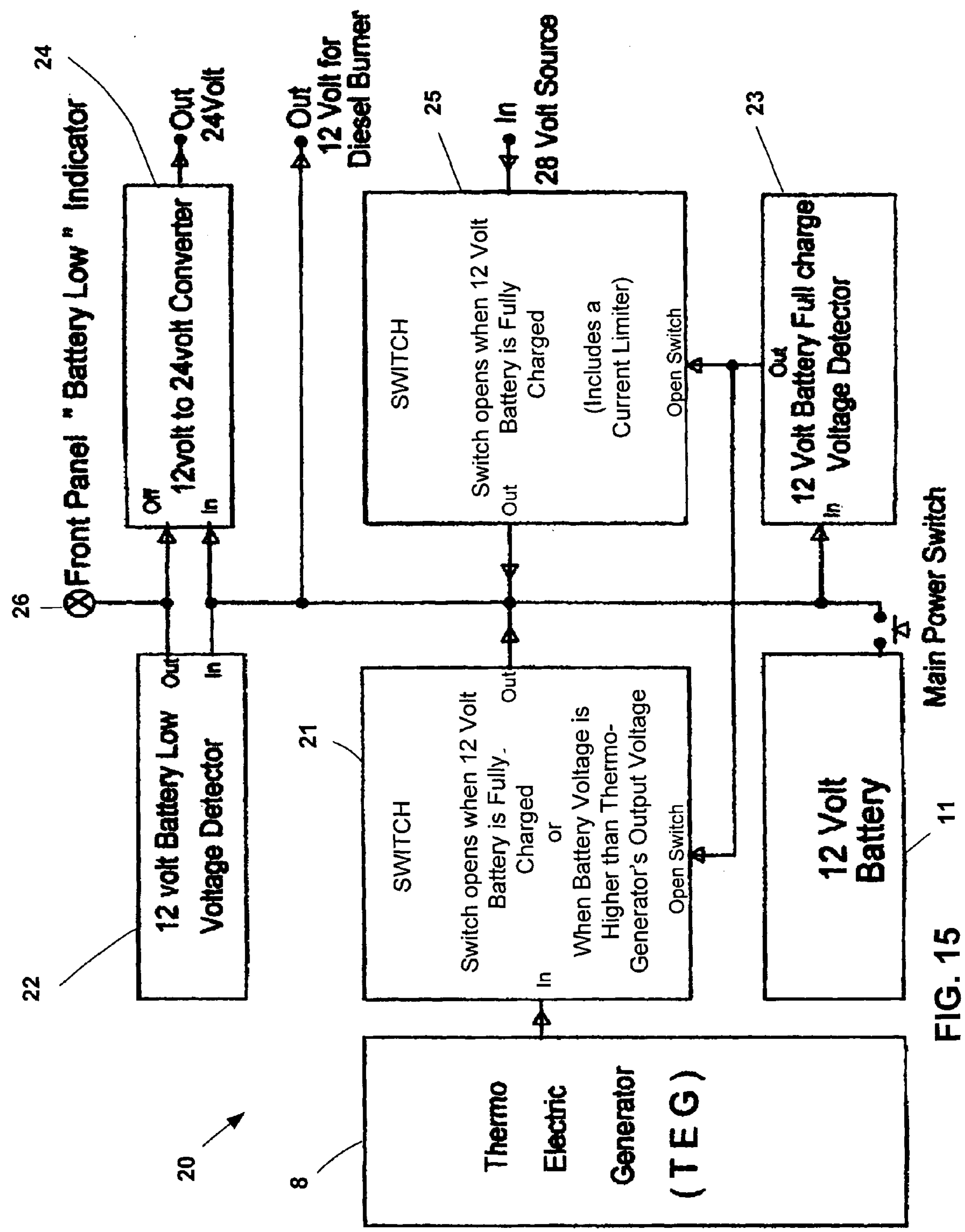
FIGS. 15-16 show a preferred electric connectivity.
Figure 16:
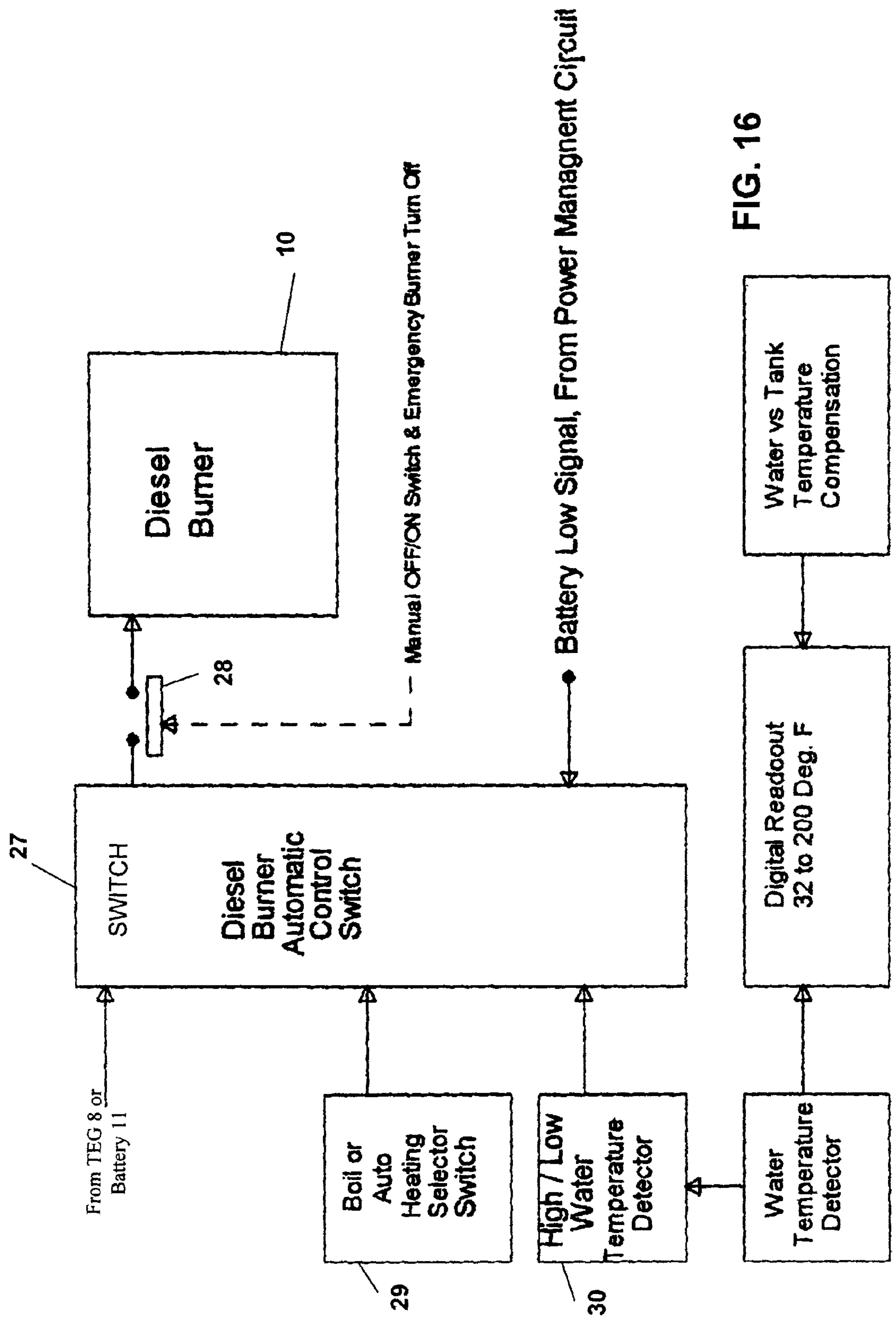

A preferred electric configuration for the present invention is shown in FIGS. 15 and 16. As shown in FIG. 15, power management system 20 includes thermoelectric generator 8, switch 21 (which directs the power produced by thermoelectric generator 8 to battery 11 or the external load (i.e. burner 10)), battery low voltage detector 22, battery full charge detector 23, 12V to 24V DC/DC converter 24, and switch 25, which is a device that allows charging battery 11 from an external power source.

Thermoelectric generator 8 supplies power through switch 21. This switch is preferably a solid-state device Pchannel Power MosFet. Switch 21 is programmed to open up when battery 11 has reached full voltage (about 12.64V), and thus prevents overcharging.

Switch 21 is also programmed to open if the battery voltage is higher than the voltage output of generator 8. It also contains a diode, preventing the thermoelectric generator from discharging battery 11 at low differential temperatures. Switch 25 is constructed similarly to switch 21. Switch 25 controls the current from an outside 28 volt source that can be used to charge battery 11 if needed. Normally this path is not being used. Both switch 25 and switch 21 are controlled by 12 V battery full charge detector 23, which includes a reference voltage source comparator.

Other features of power management system 20 include a 12V battery low voltage detector 22 with indicator 26, plus a 12V to 24V DC/DC converter 24 that can supply 24 volt power to the outside.

Further details of the power management system are shown in FIG. 16. Switch 27 is preferably a Power Fet Transistor.

Switch 27 receives inputs from "Boil" or "Auto" heating selector switch 29, high/low water temperature detector 30, and 12 volt battery low voltage detector 22. Switch 27 allows the nominal 12 volt electric power from thermoelectric generator 8 or battery 11 to reach burner 10 only if all the following conditions are met: (1) manual ON/OFF switch 28 is ON, (2) the water temperature is below the maximum temperature allowed in the "Auto" mode, or the food heater operates in the "Boil" mode (preferably, water temperature is measured with a LM34 Precision Fahrenheit Temperature Sensor manufactured by the National Semiconductor Corporation), and (3) the "Battery Low" signal has not been received from the power management circuit.

Adjustments

It is important to maintain the hot side of the thermoelectric modules not exceed 250° C. For example, if the hot sink is too hot (i,e. over about 300 degrees C.), the thermoelectric generators can be degraded or destroyed. On the other hand if the hot side temperature is much below 250° C., then the amount of power generated by the thermoelectric generator will be reduced.

In a preferred embodiment, the hot source is maintained at a temperature between close to 250° C. as feasible. The hot side heat source temperature can be optimized by making adjustments to the heat sink surface, the heat sink material, the thermal interface material and the burner exhaust flow profile.

Figure 17:
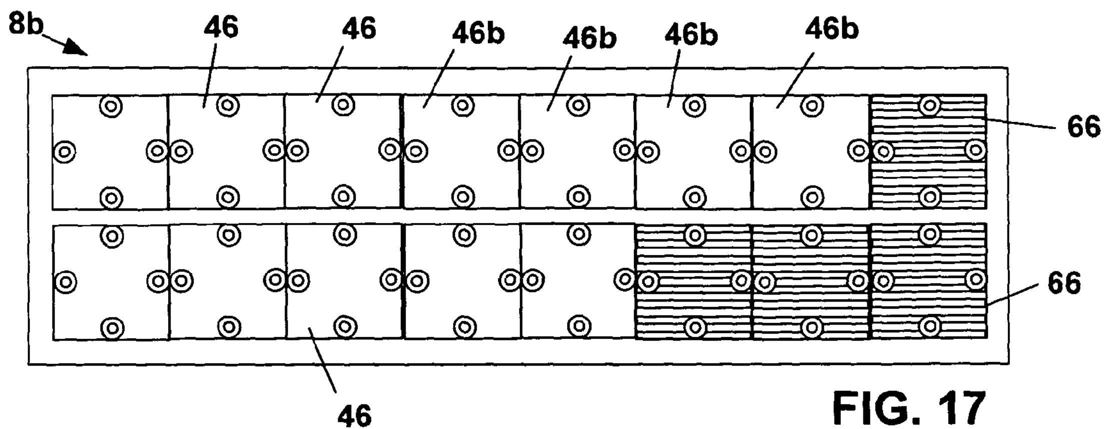
FIGS. 17-18 show another preferred thermoelectric generator.
Figure 18:
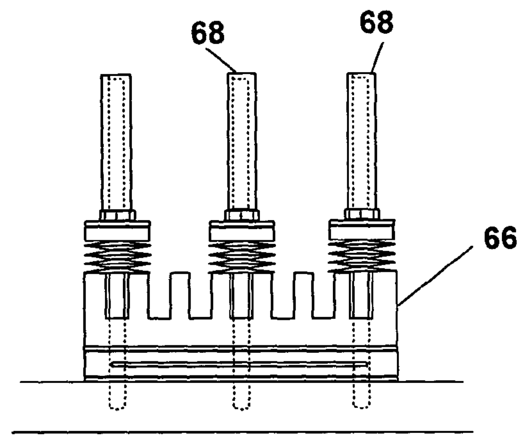

For example, FIG. 17 shows thermoelectric generator 8*b*. Prior to constructing thermoelectric generator 8*b*, Applicants built and tested a thermoelectric generator similar to that shown in FIG. 10 utilizing 16 steel flat covers for the modules. Applicants noted that of the 16 thermoelectric module heat sinks, some had an average temperature below 200° C. Some had an average temperature higher than 285° C. And some had an average temperature in the optimum range of 250° C.

This disparity between the heat sinks was because the burner exhaust flow was not uniformly distributed to each hot side heat exchanger. In an effort to normalize the hot side temperature, Applicants tested cover plates with fins which increased the heat flow to the modules and the hot side temperature of the modules. Applicants also experimented with one or more mica and alumina insulating plates to reduce the hot side temperature of modules that were too hot. In a preferred embodiment, Applicants discovered that good uniform hot side temperature could be obtained using flat plate cover plates and insulating alumina plates where necessary to reduce the module hot side temperature to slightly below 250° C.

Test of Prototype

Applicants have built and tested a prototype of a preferred embodiment utilizing a thermoelectric generator similar to thermoelectric generator 8*c* discussed above. A formal test showed that the preferred embodiment is capable of producing a sufficient amount of electric power for operating the system and for continued operation for an extended duration. The major system operating parameters were measured and a shown in FIGS. 19*a*-19*b*.

During the test, burner 10 started from the battery 11. When the voltage produced by thermoelectric generator 8 reached a value equal to the voltage of battery 11, thermoelectric generator 8 started contributing to provide power to the system and then eventually took over powering the complete system. Two shunt resistors allowed for measuring electric power that comes out from the battery (negative) and thermoelectric generator power (positive) that drive the system and charges the battery.

As shown in FIGS. 19*a*-19*b*, in 1.5 minutes after the burner was ignited, thermoelectric generator 8 started to generate electricity adequate for partial system powering. In 5.5 minutes after the burner 10 was ignited, thermoelectric generator 8 was able to completely power the system and produce surplus electricity sufficient to charge battery 11. The battery voltage after the end of the test was 12.64V corresponding to "fully charged" based on the battery charge controls. At the beginning of the test, battery voltage was 12.55V. This shows that the battery was completely recharged during the test.

Methods for Managing Temperature Effects on the Thermoelectric Generator Adjust the Hot Side Heat Exchanger (HSHE) Design As stated above, if the hot sides of the thermoelectric modules are too cool (much below 250° C.) output will be reduced below the desired output of the 20 Watt module. The hot side temperature can be increased by increasing the heat transfer area of the cover plate heat transfer area can be increased by utilizing fins, pins or other shapes. If the hot side is too hot the heat transfer area can be reduced by utilizing flat plates, short fins, short pins or other shortened shapes on the plate and by providing heat resistance (for example, insulator material) between the cover plate and the module.

Adjust the Material of the Cover Plate

High thermal conductivity materials, for example, alumina, graphite/alumina, alumina/silica carbide, or copper can be employed when the heat source has limited heat output and it is necessary to boost the module hot side temperature. Low thermal conductivity materials, for example carbon steel, stainless steel, composite materials, or ceramic materials can be employed when the heat source has high heat output and it is necessary to reduce the module hot side temperature. Depending on applications it is possibly to combine high and low conductivity materials, for example stainless steel frame with copper or aluminum inserts, that ensures high mechanical integrity with high heat transfer rate.

Shield the Thermoelectric Generator

If the thermoelectric generator hot side temperature is too high, it is possible to shield the cover plates from direct exhaust. The shields can be made of perforated, slotted or solid materials.

Adjust the Interface Materials

By selecting more or less conductive materials for the plates and varying thickness it is possible to manage precisely the thermoelectric generator hot side temperature profile.

Utilize Exhaust Flow Dividers or Turbulizers

The exhaust flow dividers can improve the exhaust flow uniformity. The turbulizers can also enhance heat transfer.

Utilize Emitting Structures Installed in the Firebox

Such structures, for example a cylinder made of perforated or slotted high temperature resistant steel can be utilized. The steel cylinder can be additionally equipped with external fins.

Also, a roll of high mesh fabricated of high temperature resistant materials can be utilized. These or other structures if positioned in the stream of hot exhaust will be heated and glow. Radiant energy will be delivered to the cover plates can improve heat transfer and make it more uniform.

The Present Invention Does Not Significantly Affect the Efficiency of the Multi-Ration Heater The prior art MRH shown in FIGS. 1A-1C takes approximately 30 minutes to start boiling the water in tank 2. Applicant's test data indicates that the time to boil is approximately the same for the present invention. By installing the thermoelectric generator some material was added between the exhaust and the bottom of the water tank 2. Additional material can reduce heat transfer. At the same time Applicants added structures (such as the cover plates with their compression structures) that increased the heat transfer area and increased the exhaust turbulence. This resulted in heat transfer enhancement. Applicants noticed during the tests that when water starts warming and initially releases air, preboiling bubbles that appeared at the bottom of the tank matched the pattern of the thermoelectric modules. This demonstrated that the regions that were covered on the bottom of the tank by the TE modules were transferring more heat that the rest of the tank. Taking into account this information Applicants conclude that their thermoelectric generator installation did not reduce but increased the transfer of heat from the fire box to the water tank.

Other Improvements

Removable Water Tank

In a preferred embodiment, water tank 2 is removable. Removable water tank 2 simplifies the thermoelectric generator fabrication process and makes it easier to provide thermoelectric generator diagnostics and repair. For example, a removable water tank makes it easier to replace a single thermoelectric module.

Extensions and Fins on Bottom and Outside of Water Tank

In order to improve heat transfer and overall system efficiency, the water tank can be equipped with extensions such as ribs, fins or pins that are positioned in the bottom of the water tank and side walls. For example, if ribs are welded to the body of the tank they will result in better water tank ruggedness and better water circulation because of the presents of hot and cold zones. Improvement in water circulation will result in better heat transfer on the cold side of the thermoelectric generator that will increase thermoelectric generator power production.

Prototype Final Testing

A completed prototype unit was tested in order to estimate the electric power production to compare with power consumption to verify positive power balance and demonstrate the system capability of operating in self-powered mode with the charging of the start up battery. Two system configurations were tested.

The first configuration included the burner that was driven by the battery and the generator that was connected to the known load (3.48 Ohms), so by measuring voltage across the load Applicants calculated current and electric power produced by the generator. The test results of the first integrated test indicate that power production was not adequate to run the system (in steady state operation with the burner consuming about 38-40 W). In order to obtain the power production data in wide range of external load values a second system configuration was assembled and tested.

The second configuration was also driven by the battery but the thermoelectric generator was connected to a special electronic loading device that allowed changing current and calculating power in a wide range of operating parameters. The test results of the second system configuration showed that at match load the generator produces close to 40 W of electric power that ensures self-powered system operation. In order to improve performance, Applicants adjusted mica layer thickness to maintain hot side temperature at 250° C. The second version was assembled and tested with external load of 3.48 Ohms. The test results clearly showed that the second version is capable of maintaining the system self-powered operation as well as charging battery During the demonstration Applicants measured the battery voltage before and after the test. Before test the battery voltage was 12.34 V, after the test the battery voltage reached 12.54 V, demonstrating that battery was completely recharged during operation. After Applicants verified the capability of the unit to power the system and to charge the battery, the power management system was integrated into the system and tested.

During the test Applicants verified the MRH major operating features, including:

MRH operation in auto mode
MRH operation in boiling mode
Water level sensor circuitry operation
Power ON indicator
Battery low voltage indicator
Low water level indicator
Panic button operation
Tilt sensor simulator
Battery overcharge protection circuitry
12/24 V DC/DC converter operation
Charging the battery from external 24 V source
Burner working hours meter operation
The system performance was demonstrated.

Although the above-preferred embodiments have been described with specificity, persons skilled in this art will recognize that many changes to the specific embodiments disclosed above could be made without departing from the spirit of the invention. For example, Belleville washers 52 can be replaced with an ordinary compression spring. Also, instead of diesel fuel or JP-8 fuel, burner 10 could burn a variety of fuel types, such as gasoline or another hydrocarbon-based fuel. The number of tension rods and springs could be two or three instead of the four shown. The modules could be mounted inside the tank with the hot side of the module compressed against a heat transfer surface of the tank with the cover plates providing the cold heat sinks for the modules. Therefore, the attached claims and their legal equivalents should determine the scope of the invention.

We claim:

1. A self-powered food heater, comprising:

A) a burner unit for burning a fluid fuel, said burner unit comprising an electric powered fuel pump and an electric powered blower, B) a fire box for receiving hot exhaust from said burner, C) a tank adapted to contain water and packaged food, said tank defining heat transfer surfaces through which heat from said burner is transferred to water in said tank, D) a plurality of thermoelectric modules, E) a plurality of module cover plates, F) electronic controls for controlling said self powered food heater, G) a plurality of compression frames, each frame comprising compression elements, for compressing each of said thermoelectric modules between one of the module cover plates and a portion of said heat transfer surfaces of said tank, wherein said plurality of thermoelectric modules provides sufficient electric power to power said fuel pump, said blower and said electronic controls, and H) one or more insulating plates positioned on with respect to a plurality of the thermoelectric modules between a hot side of each of the plurality of modules and a module cover plate in order to reduce module hot side temperatures to below safe operating temperatures for the modules.

2. The food heater as in claim 1 wherein said plurality of thermoelectric module is sixteen thermoelectric modules.

3. The food heater as in claim 1 wherein said compression elements comprise at least two tension rods and said at least two compression springs.

4. The food heater as in claim 3 wherein said at least two tension rods are four tension rods and said at least two compression springs are four compression springs.

5. The food heater as in claim 3 wherein said compression springs are Bellville washers.

6. The food heater as in claim 1, wherein said at least one thermoelectric module comprises: A) a crate having the form of an eggcrate defining a plurality of thermoelectric element spaces, B) a plurality of p-type thermoelectric elements, C) a plurality of n-type thermoelectric elements, said p-type and said n-type thermoelectric elements being positioned in said thermoelectric element spaces, D) a metallized coating on said cold surface connecting p-type thermoelectric elements to n-type thermoelectric elements on said cold surface, E) a metallized coating on said hot surface connecting p-type thermoelectric elements to n-type thermoelectric elements on said hot surface, wherein the position of said p-type and said n-type elements, the configuration of said crate having the form of an eggcrate and said metallized coatings being effective to cause a plurality of said thermoelectric elements to be electrically connected in series.

7. The food heater as in claim 1 and further comprising an electric circuit, wherein said electric circuit provides electric power to an external load.

8. The food heater as in claim 7, wherein said external load comprises a rechargeable battery.

9. The food heater as in claim 1 wherein said burner unit is a diesel burner that burns diesel fuel.

10. The food heater as in claim 1 wherein said burner unit is a burner that burns gasoline.

11. The food heater as in claim 1 wherein said burner unit is a burner that burns JP-8 fuel.

12. The food heater as in claim 1, further comprising a power management system.

13. The food heater as in claim 1 wherein the one or more insulating plates are the comprised of mica.

14. The food heater as in claim 1 wherein the one or more insulating plates are the comprised of alumina.

* * * * *